Figure 1:
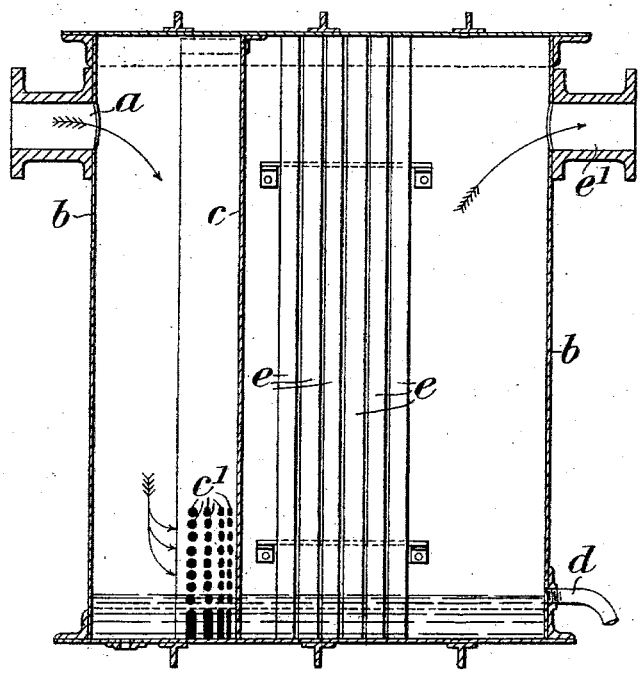

No. 752,194. PATENTED FEB. 16, 1904.
W. J. BAKER.
APPARATUS FOR SEPARATING GREASE OR WATER FROM STEAM.
APPLICATION FILED AUG. 24, 1903.
NO MODEL. 5 SHEETS—SHEET 1.

Witnesses. Inventor.

No. 752,194. PATENTED FEB. 16, 1904.
W. J. BAKER.
APPARATUS FOR SEPARATING GREASE OR WATER FROM STEAM.
APPLICATION FILED AUG. 24, 1903.
NO MODEL. 5 SHEETS—SHEET 2.
Fig. 3.
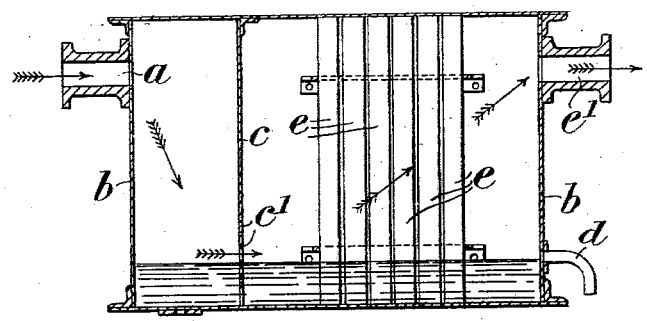
Fig. 5.
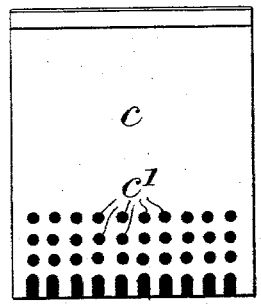
Fig. 4.
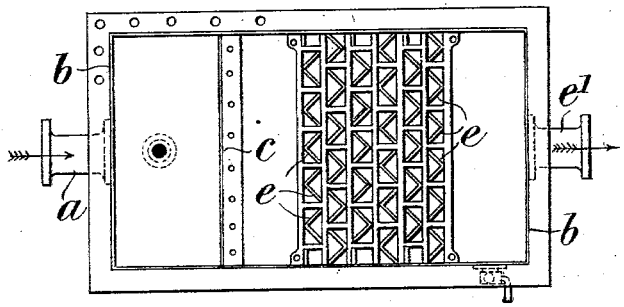
Fig. 6.
Fig. 8
Fig. 7.
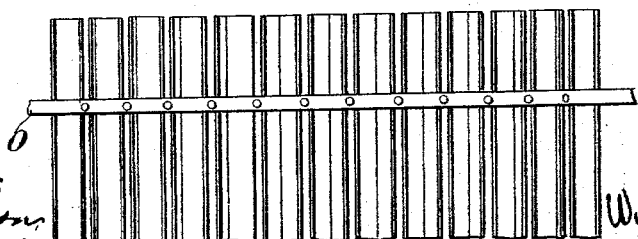
Witnesses
Inventor No. 752,194. PATENTED FEB. 16, 1904.
W. J. BAKER.
APPARATUS FOR SEPARATING GREASE OR WATER FROM STEAM.
APPLICATION FILED AUG. 24, 1903.
NO MODEL. 5 SHEETS—SHEET 3.
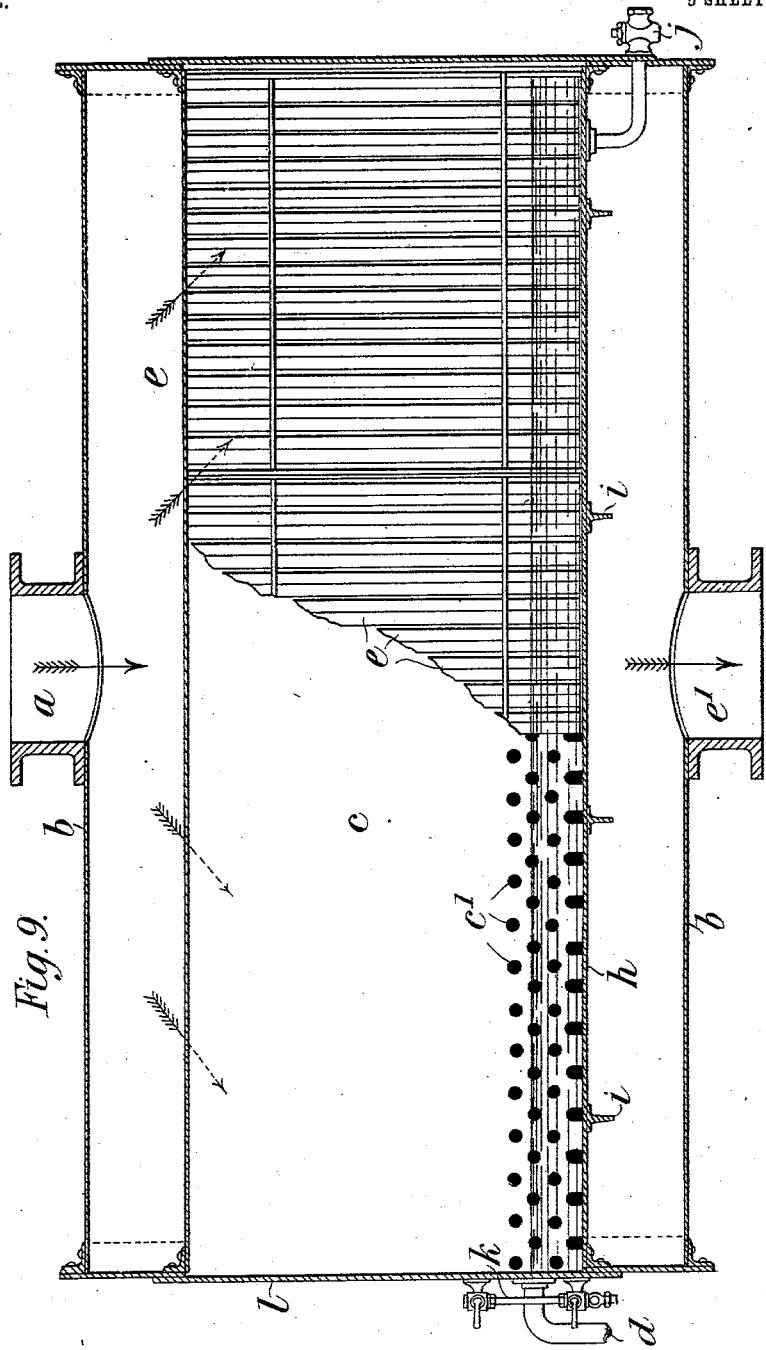

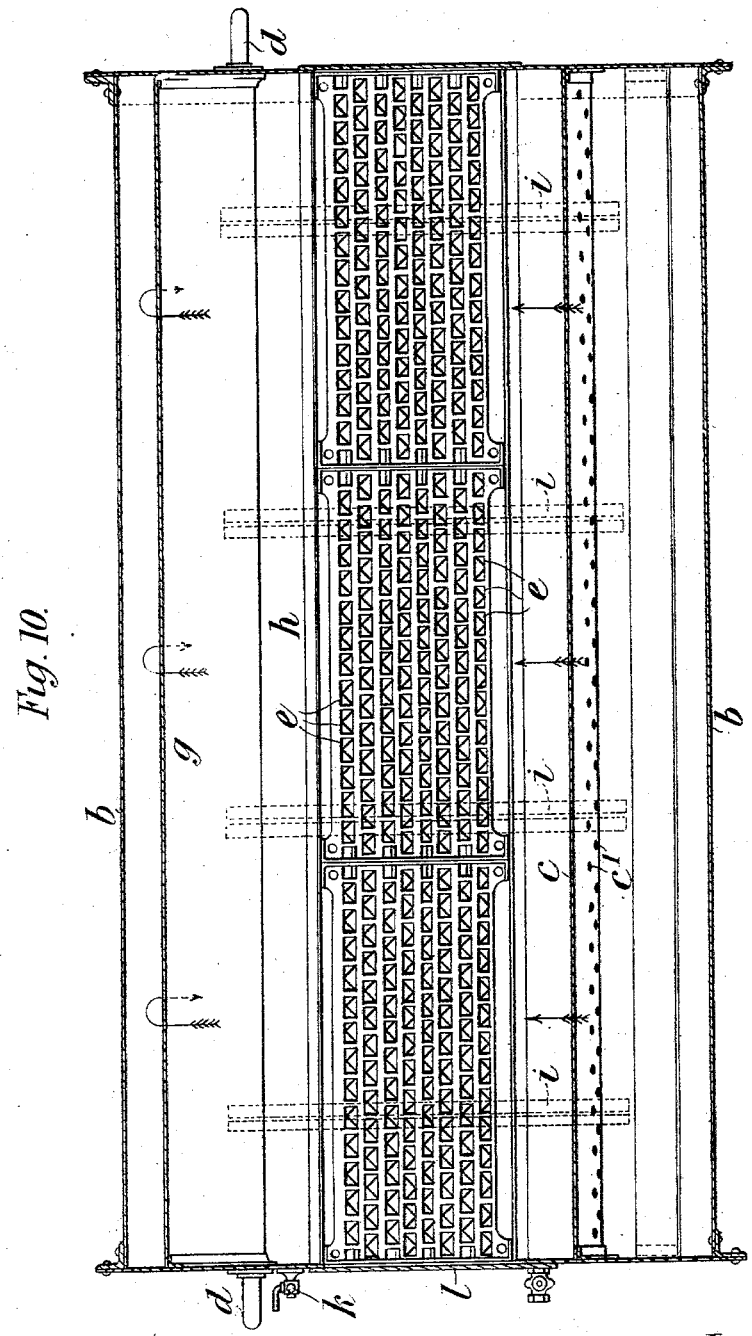

No. 752,194. PATENTED FEB. 16, 1904.
W. J. BAKER.
APPARATUS FOR SEPARATING GREASE OR WATER FROM STEAM.
APPLICATION FILED AUG. 24, 1903.
NO MODEL. 5 SHEETS—SHEET 5.
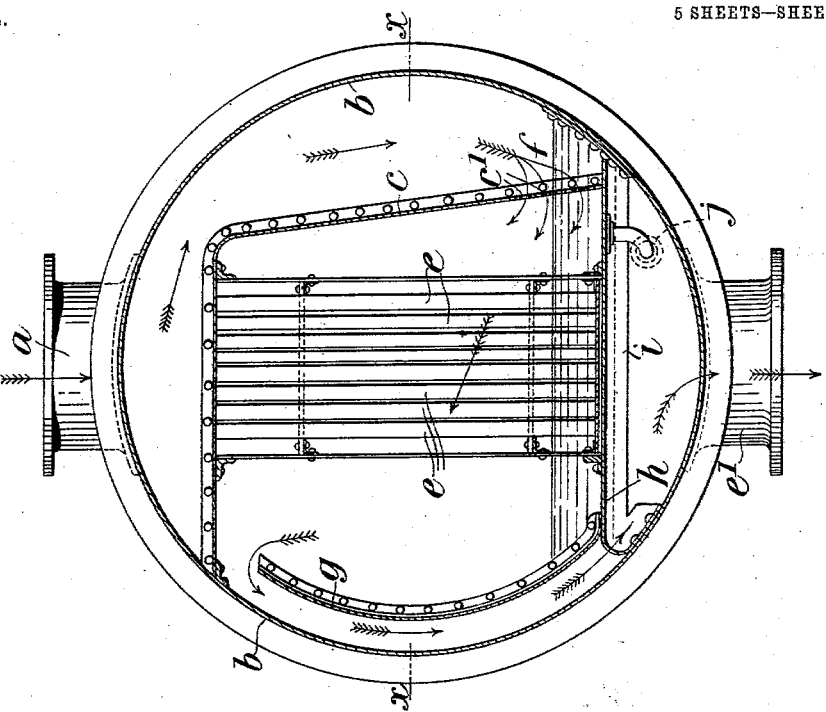
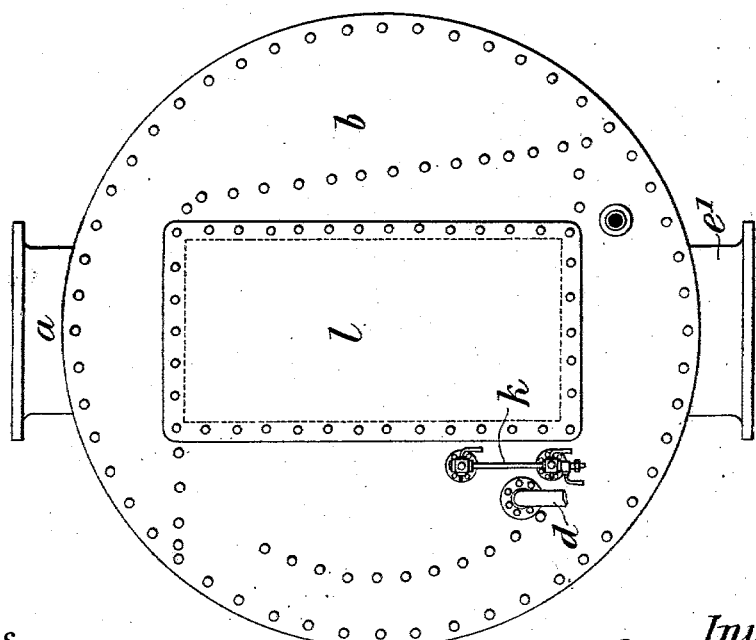

No. 752,194. Patented February 16, 1904.

UNITED STATES PATENT OFFICE.

WILLIAM JAMES BAKER, OF SCARBOROUGH, ENGLAND.

APPARATUS FOR SEPARATING GREASE OR WATER FROM STEAM.

SPECIFICATION forming part of Letters Patent No. 752,194, dated February 16, 1904.

Application filed August 24, 1903. Serial No. 170,643. (No model.)

*To all whom it may concern:*

Be it known that I, WILLIAM JAMES BAKER, a subject of the King of Great Britain, residing at Peasholme House, Scarborough, county of York, England, have invented new and useful Improvements in and Relating to Apparatus for Separating Grease or Water from Steam, of which the following is a specification.

This invention relates to improvements in apparatus employed in the separation of grease from exhaust-steam or in the separation of water from steam, the said invention being also applicable to the separation of other liquids or suspended particles from vapors or gases.

According to the invention I make use of apparatus having an expansion-chamber, one side of which acts also as a deflector for altering the direction of the current of exhaust-steam entering the separator and is perforated at its lower part to allow a gentle flow of steam, which is distributed across the width or length of the separator, and thereby to prevent the splashing or uplifting of the greasy water at the bottom of the separator, which occurs when a current of steam rushes down vertically upon a surface of water and in oil-separators is frequently the cause of the carrying forward of grease through the separator. The rows of angle-iron bafflers or other screens of bafflers, such as perforated plates, are arranged longitudinally instead of transversely in the body of a separator, as has heretofore been usual, whereby a larger area of baffling or grease-collecting surface is immediately presented to the steam as it issues from the expansion-chamber and deflector previously referred to. I also make use of an improved arrangement of flat bars and conical rivets for fixing together rows of angle-iron bars to be employed in separators and which rows of angle-irons are hereinafter referred to as "screens."

In order to enable this invention to be fully understood, I will proceed to describe the same with reference to the accompanying drawings, in which—

Figure 2:
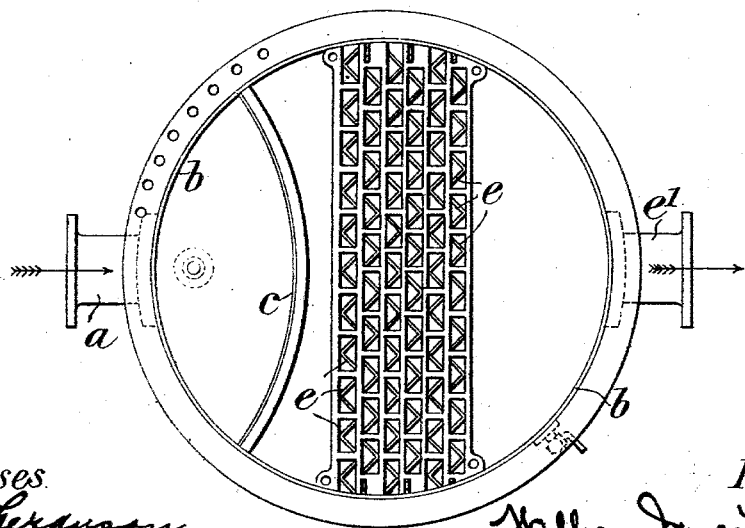

Figure 1 represents in sectional elevation, and Fig. 2 in plan, with the cover removed, a cylindrical oil-separator fitted with the improved expansion-chamber and deflector. Figs. 3 and 4 represent a sectional elevation and a plan, with the cover removed, respectively, of a rectangular separator fitted with a similar deflector; and Fig. 5 is a front view of the improved deflector. Fig. 6 represents in sectional plan, and Fig. 7 in elevation, a portion of a screen in which the angle-irons are fixed to cross-bars in a special manner and by the special rivets shown at Fig. 8. Fig. 9 is a sectional elevation of a cylindrical separator placed horizontally and fitted with the improved form of deflector and having rows of angle-iron bafflers or screens arranged longitudinally. Fig. 10 is a sectional plan thereof, the section being taken on the line $x\ x$, Fig. 12. Fig. 11 is an external end elevation, and Fig. 12 is a transverse section of the same.

Arrows indicate the direction of steam-currents.

In the arrangement shown in Figs. 1, 2, 3, 4, and 5 the steam enters at $a$ and immediately expands in the chamber formed by the walls of the separator $b$ and the deflector $c$. The upper part of this deflector is left plain—that is to say, is not perforated; but the lower portion is perforated with a number of holes $c'$, whose combined area equals about one and a half times the area of the steam-inlet of the separator. The upper portion of the deflector $c$ is specially left without perforations in order that the whole of the steam containing grease, which is partly in the form of spray, may be directed downward upon the surface of water contained at the bottom of the separator, a great part of the greasy spray being attracted and held by the water which as it accumulates passes through the holes near the bottom of the deflector and finally is drawn off through the overflow-pipe $d$. The steam after passing the angle-iron bafflers $e$ flows out through the outlet $e'$.

In the cylindrical separator, fixed horizontally, (shown at Figs. 9, 10, 11, and 12,) the exhaust-steam entering the inlet branch $a$ passes into a large space or expansion-chamber formed between the deflector-plate $c$ and the shell $b$ of the separator, and this steam first coming in contact with the surface of water at the level *f* passes through the perforations at the lower part of the deflector along the whole length and being thus diffused evenly it approaches the whole line of angle-iron screens *e e* and passes between them and in the direction indicated by the arrows, thence down the passage between the outlet-deflector *g* and the shell *b* of the separator into the space under the false bottom *h* and out at the branch *e'*. The false bottom *h* is carried upon cross-girders *i i*. The overflow-pipes for separated grease mixed with a portion of water are shown at *d d*, a drain-cock at *j*, and water-gage at *k*.

For convenience of lifting and handling the angle-iron bafflers *e* are arranged in groups in plain iron boxes, introduced into the separator after it is fixed through the opening in the end thereof, which is closed by the cover *l*, Fig. 11.

In the method of fixing angle-iron bars in rows to form screens for oil-separators holes are drilled in a flat bar of iron *o*, Fig. 7, at regular intervals, according to the width of the angle-iron, and into these holes the conical-headed rivets, Fig. 8, are placed and secured by hammering up. Each angle-iron is held by a conical rivet-head on each side of it, as shown at Fig. 6, and two or more bars may be employed, according to the height of the screen required. After fixing the bars *o* can be bent to the desired shape, as shown in Fig. 6.

The main features of my present invention are especially applicable to the apparatus described in the specification of my former patents No. 18,602 of 1894, No. 5,516 of 1895, No. 15,384 of 1897, and No. 3,860 of 1902.

Having now particulary described and ascertained the nature of my said invention and in what manner the same is to be performed, I declare that what I claim is—

1. In a grease-separator, the combination with a chamber having a steam-inlet adjacent to the top thereof, and a steam-outlet, of a deflector adjacent to the steam-inlet, extending from the top to the bottom of said chamber having its upper part imperforate and its lower part provided with a plurality of small apertures, and a plurality of vertically-disposed bafflers located in said chamber and interposed between said deflector and the steam-outlet, substantially as described.

2. In a grease-separator, the combination with a chamber having a steam-inlet adjacent to the top thereof, and a steam-outlet, of a deflector adjacent to the steam-inlet, extending from the top to the bottom of said chamber having its upper part imperforate and its lower part provided with a plurality of small apertures, for the passage of steam and provided at its bottom edge with apertures for the passage of water and oil and a plurality of vertically-disposed bafflers within said chamber and interposed between said deflector and steam-outlet, substantially as described.

3. In a grease-separator, the combination with a horizontally-disposed chamber provided with a steam-inlet and a steam-outlet, of a vertically-disposed deflector adjacent to said inlet extending longitudinally through the entire length of said chamber said deflector having its upper part imperforate and being provided adjacent to its lower edge with a plurality of small apertures and a plurality of vertically-disposed bafflers extending longitudinally throughout the entire length of said chamber and interposed between said deflector and the steam-outlet, substantially as described.

4. In a grease-separator, the combination with a horizontally-disposed chamber provided with a steam-inlet and a steam-outlet, of a vertically-disposed deflector adjacent to said inlet extending longitudinally through the entire length of said chamber, said deflector having its upper part imperforate and being provided adjacent to its lower edge with a plurality of small apertures, a plurality of vertically-disposed bafflers extending longitudinally throughout the entire length of said chamber and interposed between said deflector and the steam-outlet and a vertically-disposed deflector interposed between said bafflers and the steam-outlet and extending longitudinally of said chamber, substantially as described.

5. In a grease-separator, a baffling-screen comprising a plurality of angle-irons, a securing-bar engaging the exterior edges of said angle-irons and rivets provided with conical heads passing through said securing-bar and having the conical heads engaging the adjacent edges of said angle irons, substantially as described.

WILLIAM JAMES BAKER.

Witnesses:
MARK D. HICK,
J. P. MEDLEY.